(12) United States Patent
Lee et al.

(10) Patent No.: US 9,199,355 B2
(45) Date of Patent: Dec. 1, 2015

(54) APPARATUS FOR GRINDING A SUBSTRATE AND METHOD OF USING THE SAME

(71) Applicant: Samsung Display Co., Ltd., Yongin, Gyeonggi-do (KR)

(72) Inventors: Inho Lee, Suwon-si (KR); Hwankyeong Jeong, Asan-si (KR); Jinwoo Kim, Suwon-si (KR); Goangyoung Park, Hwaseong-si (KR); Sanghoon Back, Asan-si (KR); Eehyun An, Hwaseong-si (KR)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 267 days.

(21) Appl. No.: 13/728,671

(22) Filed: Dec. 27, 2012

(65) Prior Publication Data
US 2013/0316618 A1 Nov. 28, 2013

(30) Foreign Application Priority Data
May 22, 2012 (KR) ........................ 10-2012-0054443

(51) Int. Cl.
*B24B 49/12* (2006.01)
*B24B 41/00* (2006.01)
*B24B 9/10* (2006.01)

(52) U.S. Cl.
CPC . *B24B 49/12* (2013.01); *B24B 9/10* (2013.01); *B24B 41/00* (2013.01)

(58) Field of Classification Search
CPC ........ B24B 49/00; B24B 49/12; B24B 41/00; B24B 41/005; B24B 37/345; B24B 9/10
USPC .......... 451/5, 6, 10, 11, 21, 41, 333, 335, 339
See application file for complete search history.

(56) References Cited

U.S. PATENT DOCUMENTS

| | | | | |
|---|---|---|---|---|
| 3,791,084 A | * | 2/1974 | Kakumu et al. | 451/21 |
| 4,020,598 A | * | 5/1977 | Harmant | 451/124 |
| 4,528,743 A | * | 7/1985 | Bleich | 483/10 |
| 4,654,953 A | * | 4/1987 | Hobbs | 483/33 |
| 5,119,600 A | * | 6/1992 | Chikatsune et al. | 451/21 |

(Continued)

FOREIGN PATENT DOCUMENTS

| | | |
|---|---|---|
| JP | 2002-370145 | 12/2002 |
| JP | 2008-023677 | 2/2008 |

(Continued)

*Primary Examiner* — Eileen Morgan
(74) *Attorney, Agent, or Firm* — F. Chau & Associates, LLC (57) ABSTRACT

An apparatus for grinding a substrate includes a stage part configured to support a substrate thereon, a grinding part, a camera part, a replacing part and a control unit. The grinding part includes a grinding wheel configured to grind an edge of the substrate. The camera part is configured to take a picture of the grinding wheel, analyze the picture of the grinding wheel and generate information about the grinding wheel. The replacing part includes a spare grinding wheel and is configured provide the spare grinding wheel to the grinding part or pick up the grinding wheel from the grinding part. The control unit is configured to receive the grinding wheel information from the camera part and offset compensate a position of the grinding wheel on the basis of the grinding wheel information or communicate with the replacing part to replace the grinding wheel on the basis of the grinding wheel information.

22 Claims, 8 Drawing Sheets

(56) References Cited

U.S. PATENT DOCUMENTS

| | | | |
|---|---|---|---|
| 5,220,749 A * | 6/1993 | Youden et al. | 451/65 |
| 5,458,527 A * | 10/1995 | Kondo et al. | 451/21 |
| 5,586,928 A * | 12/1996 | Wiand et al. | 451/177 |
| 5,697,834 A * | 12/1997 | Heumann et al. | 451/440 |
| 6,315,799 B1 * | 11/2001 | Toniolo | 451/65 |
| 6,325,704 B1 | 12/2001 | Brown et al. | |
| 6,428,390 B1 | 8/2002 | Clark et al. | |
| 6,949,005 B1 * | 9/2005 | Larsen et al. | 451/5 |
| 7,001,249 B1 | 2/2006 | Pride et al. | |
| 7,131,893 B2 | 11/2006 | Shin | |
| 7,153,190 B2 * | 12/2006 | Mavro-Michaelis | 451/8 |
| 7,179,155 B2 | 2/2007 | Shin et al. | |
| 7,335,091 B2 * | 2/2008 | Burgess | 451/273 |
| 2006/0035565 A1 * | 2/2006 | Mavro-Michaelis | 451/8 |
| 2009/0233529 A1 | 9/2009 | Ueda | |
| 2011/0021116 A1 | 1/2011 | Brown et al. | |

FOREIGN PATENT DOCUMENTS

| | | |
|---|---|---|
| JP | 2009-028870 | 2/2009 |
| JP | 2011-224668 | 11/2011 |
| KR | 1020040028389 | 4/2004 |
| KR | 1020050082638 | 8/2005 |
| KR | 1020050118558 | 12/2005 |
| KR | 1020060078166 | 7/2006 |
| KR | 1020060095754 | 9/2006 |
| KR | 1020070087820 | 8/2007 |
| KR | 1020070109302 | 11/2007 |
| KR | 1020070121205 | 12/2007 |
| KR | 1020070121434 | 12/2007 |
| KR | 1020080106680 | 12/2008 |
| KR | 1020090021769 | 3/2009 |
| KR | 1020100018202 | 2/2010 |
| KR | 1020100048732 | 5/2010 |
| KR | 1020100132131 | 12/2010 |
| KR | 101030084 | 4/2011 |
| KR | 1020110044120 | 4/2011 |
| KR | 1020110072030 | 6/2011 |
| KR | 1020110111823 | 10/2011 |
| KR | 1020110119133 | 11/2011 |
| KR | 20110139188 | 12/2011 |

* cited by examiner

APPARATUS FOR GRINDING A SUBSTRATE AND METHOD OF USING THE SAME

CROSS-REFERENCE TO RELATED APPLICATION

This application claims priority under 35 U.S.C. §119 to Korean Patent Application No. 10-2012-0054443, filed on May 22, 2012, the disclosure of which is hereby incorporated by reference herein in its entirety.

1. Technical Field

The present disclosure relates to an apparatus for grinding a substrate and a method of using the same. More particularly, the present disclosure relates to an apparatus for grinding an edge of a substrate and a method of grinding the edge of the substrate using the same.

2. Discussion of the Related Art

A display device includes a display panel to display an image, and the display panel includes, for example, a glass substrate or a plastic substrate as its insulating substrate. In addition, a solar cell includes, for example, a tempered glass as its substrate.

To manufacture the display panel or the solar cell, a process for cutting a substrate and a process for grinding an edge of the substrate may be required. The edge indicates, for example, a corner at which a side surface of the substrate meets with an upper or lower surface of the substrate.

A conventional substrate grinding apparatus may include a rough grinding part performing a rough grinding process and a finish grinding part performing a finish grinding process. The rough grinding part and the finish grinding part are coupled with x-axis direction shafts, respectively. However, when the axes of the x-axis direction shafts are twisted, the edge of the substrate may not be uniformly ground.

In addition, whenever the grinding process is performed, a position of the rough grinding part against the substrate or a position of the finish grinding part against substrate may be required to be compensated. As a result, the total time for the grinding process may be lengthened, and thus the yield of the grinding process may be lowered.

SUMMARY

Exemplary embodiments of the present invention provide an apparatus for grinding a substrate, which is capable of reducing the cost and size of equipment and increasing process efficiency.

Exemplary embodiments of the present invention provide a method of grinding the substrate, which is capable of reducing the cost and size of equipment and increasing process efficiency.

Embodiments of the present invention provide an apparatus for grinding a substrate which includes a stage part configured to support a substrate thereon, a grinding part, a camera part, a replacing part and a control unit. The grinding part includes a grinding wheel configured to grind an edge of the substrate. The camera part is configured to take a picture of the grinding wheel, analyze the picture of the grinding wheel and generate information about the grinding wheel. The replacing part includes a spare grinding wheel which is configured to provide the spare grinding wheel to the grinding part or pick up the grinding wheel from the grinding part. The control unit is configured to receive the grinding wheel information from the camera part and offset compensate a position of the grinding wheel on the basis of the grinding wheel information or communicate with the replacing part to replace the grinding wheel on the basis of the grinding wheel information.

The grinding wheel includes a rough grinding groove and a finish grinding groove.

The camera part includes a camera and a backlight. The camera is configured to take the picture of the grinding wheel and the backlight is disposed facing the camera and is configured to provide a light to the camera.

The replacing part is configured to be operated in a replacement mode or a standby mode on the basis of the grinding wheel information. The replacing part includes a replacing plate, a replacing table, and a holder. The replacing plate is configured to be rotated with reference to the z-axis as its rotation axis. The replacing table is disposed on the replacing plate and configured to move along the y-axis direction. The holder is disposed on the replacing table and configured to hold the spare grinding wheel.

The replacing plate is configured to be rotated 180 degrees about the z-axis as its rotation axis when the replacement mode is changed to the standby mode.

According to embodiments, the substrate grinding apparatus includes a first grinding part and a second grinding part. The first grinding part includes a rough grinding wheel and the second grinding part includes a finish grinding wheel. The first grinding part and the second grinding part are connected to a same x-axis transfer unit and connected to separate z-axis transfer units.

Embodiments of the present invention provide a method of grinding a substrate. The method includes loading a substrate, taking a picture of a grinding wheel and analyzing the picture of the grinding wheel to generate information about the grinding wheel, checking whether the grinding wheel is required to be replaced or not on the basis of the grinding wheel information, offset compensating a position of the substrate and the grinding wheel on the basis of the grinding wheel information, and grinding an edge of the substrate.

The method further includes replacing the grinding wheel after checking whether the grinding wheel is required to be replaced.

In accordance with an exemplary embodiment of the present invention, an apparatus for grinding a substrate is provided. The apparatus includes a stage part which includes a stage configured to support a substrate thereon and a stage body fixed to the stage, a lower frame supporting the stage part, wherein the stage body is disposed between the stage and the lower frame, a grinding part that includes a grinding wheel configured to grind an edge of the substrate, a spindle operatively connected to the grinding wheel and configured to pivot the grinding wheel along a z-axis direction, a grinding chuck connecting the spindle and the grinding wheel to each other, and a spindle transfer, an x-axis transfer unit configured move in an x-axis direction which is perpendicular to the z-axis direction, wherein the x-axis transfer unit includes an x-axis shaft operatively connected to the spindle transfer, an x-axis motor which is configured to rotate the x-axis shaft, and an x-axis guide rail which is configured to guide movement of the spindle transfer along the x-axis direction.

The apparatus further includes a camera part including a camera configured to take a picture of the grinding wheel, analyze the picture of the grinding wheel and generate information about the grinding wheel, a backlight facing the camera and configured to provide light to the camera, and a camera supporter, wherein the camera and the backlight are spaced apart from each other and are disposed on the camera supporter, a replacing part that includes a spare grinding wheel, wherein the replacing part is configured to provide the spare grinding wheel to the grinding part or pick up the grinding wheel from the grinding part, and a control unit configured to receive the grinding wheel information from the camera part and offset compensate a position of the grinding wheel on the basis of the grinding wheel information or communicate with the replacing part to replace the grinding wheel on the basis of the grinding wheel information.

In addition, the apparatus further includes an upper frame supporting the grinding part and the replacing part and a column frame disposed between the upper frame and the lower frame at a position corresponding to an end portion of the lower frame and the upper frame.

According to the above exemplary embodiments, the number of the grinding parts may be reduced, and thus the cost and size of the substrate grinding apparatus may be reduced. In addition, the rough grinding process and the finish grinding process may be accurately performed by taking the picture of the grinding wheel and adjusting an offset compensation value based upon on the picture of the grinding wheel. Further, the amount of time required for replacing the grinding wheel may be shortened, thereby increasing process efficiency.

BRIEF DESCRIPTION OF THE DRAWINGS

Exemplary embodiments of the present invention can be understood in more detail from the following detailed description when taken in conjunction with the accompanying drawings in which.

DETAILED DESCRIPTION OF EXEMPLARY EMBODIMENTS

It will be understood that when an element or layer is referred to as being "on", "connected to" or "coupled to" another element or layer, it can be directly on, connected or coupled to the other element or layer or intervening elements or layers may be present. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms, "a", "an" and "the" are intended to include the plural forms as well, unless the context clearly indicates otherwise.

Hereinafter, exemplary embodiments of the present invention will be explained in detail with reference to the accompanying drawings.

In the description hereinafter, x-, y-, and z-axes mean, for example, directions substantially perpendicular to each other on a three-dimensional space. Accordingly, only two axes among the x-, y-, and z-axes have been shown in figures, and the direction of remaining one axis may be obviously recognized.

In addition, a process space means, for example, a three-dimensional space in which a substrate SB is ground by a grinding part 200 and a stage part 100.

Figure 1:
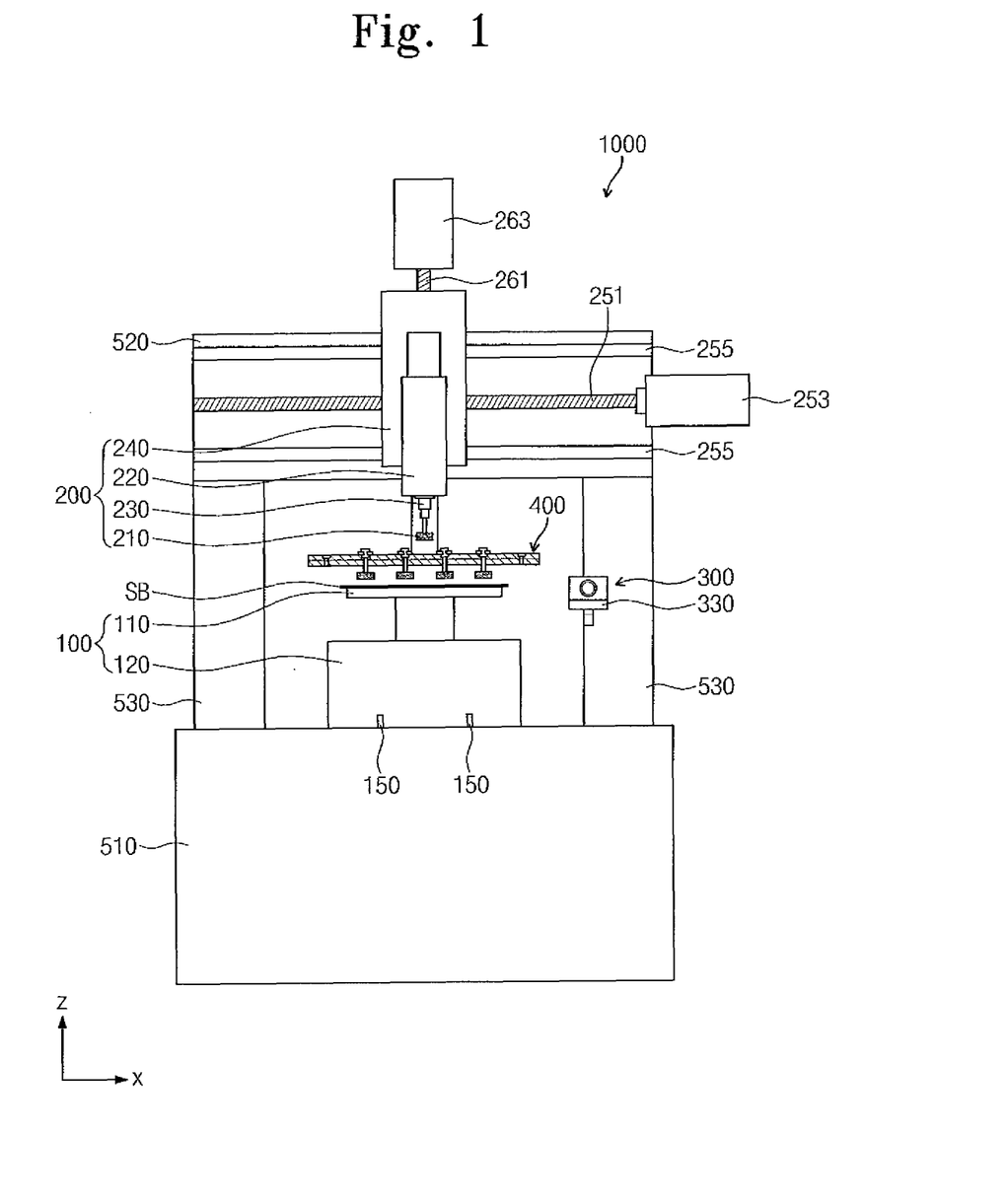
FIG. 1 is a front view showing a substrate grinding apparatus according to an exemplary embodiment of the present invention.
Figure 2:
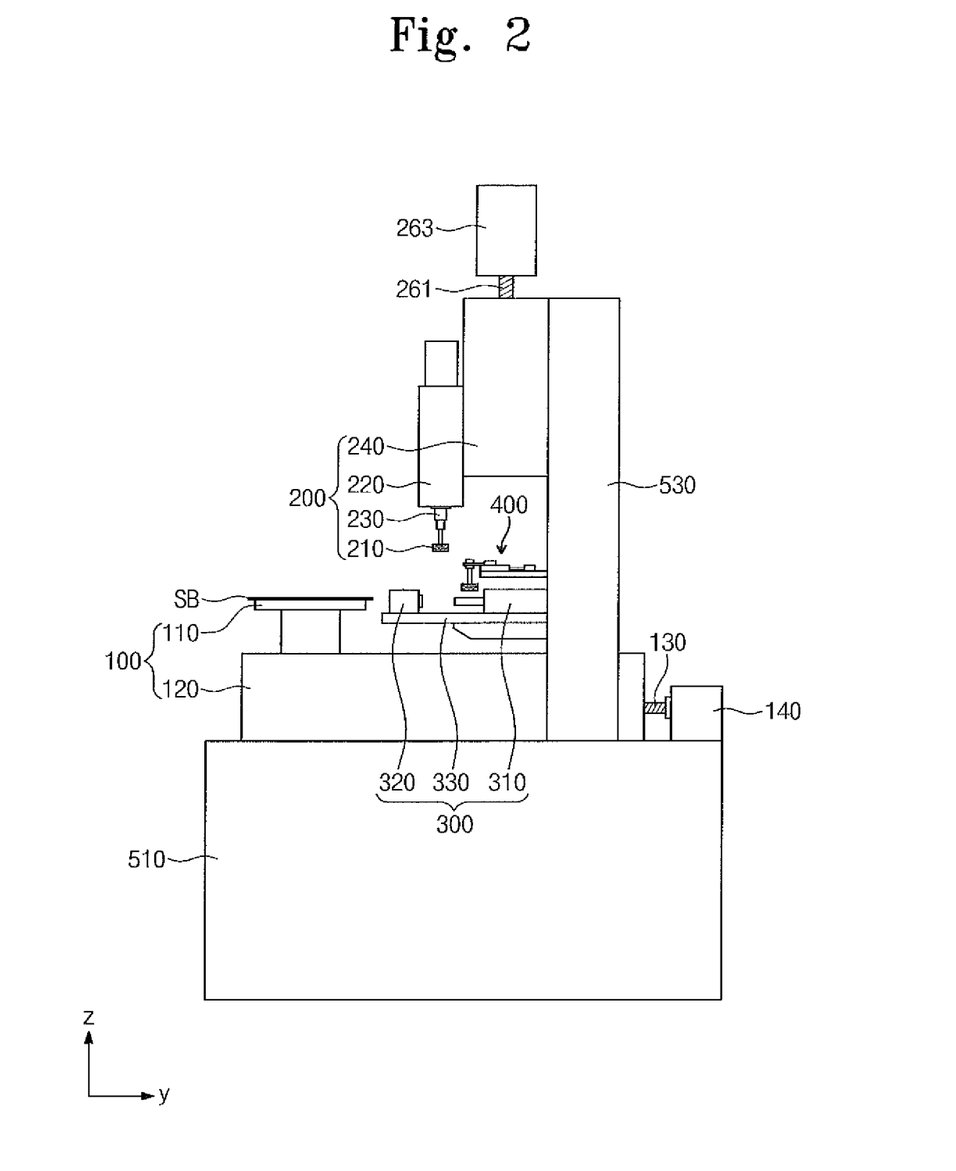
FIG. 2 is a side view showing the substrate grinding apparatus shown in FIG. 1.

FIG. 1 is a front view showing a substrate grinding apparatus according to an exemplary embodiment of the present invention and FIG. 2 is a side view showing the substrate grinding apparatus shown in FIG. 1.

Referring to FIGS. 1 and 2, the substrate grinding apparatus 1000 includes, for example, a stage part 100, a grinding part 200, a camera part 300, and a replacing part 400. The substrate grinding apparatus 1000 may further include, for example, a frame. The frame includes, for example, a lower frame 510, an upper frame 520, and a column frame 530.

The lower frame 510 supports the stage part 100. The upper frame 520 supports the grinding part 200 and the replacing part 400. The column frame 530 is located at, for example, a position corresponding to an end portion of the lower frame 510 and the upper frame 520 and the column frame 530 is connected between the lower frame 510 and the upper frame 520. In FIG. 1, two column frames 530 have been shown but the number and shape of the column frame 530 of exemplary embodiments of the present invention are not limited thereto or thereby. In addition, the lower frame 510, the upper frame 520, and the column frame 530 are separated from each other, but exemplary embodiments of the present invention are not be limited thereto or thereby. For example, alternatively in an exemplary embodiment, the lower frame 510, the upper frame 520, and the column frame 530 may be integrally formed with each other.

The stage part 100 includes, for example, a stage 110 on which a substrate SB is loaded and a stage body 120. The substrate SB may be formed of, for example, a transparent insulation material such as glass, quartz, or plastic. Further, in an exemplary embodiment, the transparent glass may include, for example, tempered glass. In an exemplary embodiment, the transparent plastic may be, for example, one of polycarbonate (PC), polyester (PET), polypropylene (PP), polyethylene (PE) and polymethyl methacrylate (PMMA). Alternatively, the substrate SB may instead be formed of a non-transparent material such as, for example, a silicon plate or ceramics.

The stage 110 is fixed to the stage body 120, and the stage body 120 is disposed between the stage 110 and the lower frame 510.

The stage body 120 is coupled with, for example, a y-axis transfer unit which moves in a y-axis direction. The y-axis transfer unit includes, for example, a y-axis shaft 130, a y-axis motor 140, and a y-axis guide rail 150.

The y-axis shaft 130 may be, for example, a mechanical actuator such as a ball screw having a ball-shaped thread which is thread-coupled with the stage body 120 but exemplary embodiments are not limited thereto. For example, alternatively, the y-axis shaft 130 may include other mechanical actuators such as a roller screw, a leadscrew, or a screw jack. The y-axis motor 140 rotates the y-axis shaft 130. The y-axis guide rail 150 guides the movement of the stage body 120.

When the y-axis motor 140 is operated, the stage body 120 moves along the y-axis direction via the y-axis guide rail 150.

Although not shown in FIGS. 1 and 2, the substrate grinding apparatus 1000 may further include, for example, a loading part that loads or unloads the substrate SB. The loading part may be disposed, for example, on a path corresponding to the y-axis direction along which the stage body 120 moves. In an exemplary embodiment of the present invention, the loading part may include, for example, a robot arm for loading and unloading the substrate SB.

For example, the stage body 120 moves to the position of the loading part to load the substrate SB before a grinding process is performed or unloads the substrate SB after a grinding process is finished.

The grinding part 200 includes, for example, a grinding wheel 210, a spindle 220, a grinding chuck 230, and a spindle transfer 240. The grinding part 200 performs, for example, a rough grinding process or a finish grinding process on an edge of the substrate SB.

The grinding wheel 210 grinds a side edge of the substrate SB. The grinding wheel 210 includes, for example, a rough grinding groove and a finish grinding groove. Thus, the grinding wheel 210 may perform both the rough grinding process and the finish grinding process. The shape of the grinding wheel 210 will be described in detail later.

The spindle 220 is equipped with, for example, the grinding wheel 210 to pivot the grinding wheel 210 about the z-axis.

The grinding chuck 230 connects the spindle 220 and the grinding wheel 210. An upper portion of the grinding chuck 230 is coupled with a lower portion of the spindle 220 and a lower portion of the grinding chuck 230 is coupled with or separated from the grinding wheel 210. For instance, the grinding chuck 230 is provided with a chuck hole and the grinding wheel 210 is inserted into the chuck hole. Then, the grinding wheel 210 inserted into the chuck hole is fastened or released by, for example, a claw, so the grinding wheel 210 may be coupled with or separated from the grinding chuck 230.

The spindle transfer 240 is connected with an x-axis transfer unit and a z-axis transfer unit to be transferred in the x-axis direction and the z-axis direction, respectively. The x-axis transfer unit includes, for example, an x-axis shaft 251, an x-axis motor 253, and an x-axis guide rail 255. The z-axis transfer unit includes, for example, a z-axis shaft 261, a z-axis motor 263, and a z-axis guide rail (not shown).

The x-axis shaft 251 may be, for example, a mechanical actuator such as a ball screw having a ball-shaped thread which is thread-coupled with the spindle transfer 240 but exemplary embodiments of the present invention are not limited thereto. For example, alternatively, the x-axis shaft 130 may include other mechanical actuators such as a roller screw, a leadscrew, or a screw jack. The x-axis motor 253 rotates the x-axis shaft 251. The x-axis guide rail 255 guides the movement of the spindle transfer 240 along the x-axis direction.

When the x-axis motor 253 is operated, the spindle transfer 240 moves along the x-axis direction via the x-axis guide rail 255.

In an exemplary embodiment, the x-axis transfer unit, the y-axis transfer unit and the z-axis transfer unit may be, for example, a conveyor such as a belt conveyor, a live roller belt conveyor, or a chain conveyor.

The grinding wheel 210 grinds the side edge of the substrate SB, which is, for example, substantially in parallel with the x-axis, while the spindle transfer 240 moves along the x-axis direction.

In addition, the grinding wheel 210 grinds the side edge of the substrate SB, which is substantially in parallel with the y-axis, while the stage body 120 moves along the y-axis direction.

Consequently, due to the movement of the spindle transfer 240 and the stage body 120, the side edge of the substrate SB may be ground. In the present exemplary embodiment, the substrate SB has a rectangular flat plate shape, but exemplary embodiments of the present invention are not limited thereto or thereby. That is, as the spindle transfer 240 and the stage body 120 may independently move in the x- and y-axis directions, the side edge of the substrate SB may be ground regardless of whether the shape of the substrate is flat or not.

Similarly, the z-axis shaft 261 may be, for example, a mechanical such as a ball screw having a ball-shaped thread which is thread-coupled with the spindle transfer 240 but exemplary embodiments of the present invention are not limited thereto. For example, alternatively, the z-axis shaft 130 may include other mechanical actuators such as a roller screw, a leadscrew, or a screw jack. The z-axis motor 263 rotates the z-axis shaft 261. The z-axis guide rail (not shown) guides the movement of the spindle transfer 240 along the z-axis direction.

When the z-axis motor 263 is operated, the spindle transfer 240 moves along the z-axis direction via the z-axis guide rail (not shown).

The y-axis motor 140, the x-axis motor 253 and the z-axis motor 263 may each include, for example, one of a linear motor, a stepper motor, a servo motor, a direct current (DC) motor, or an alternating current (AC) motor. For example, in an exemplary embodiment, the y-axis motor 140, the x-axis motor 253 and the z-axis motor 263 may each include a brushed DC servo motor, a brushless AC servo motor, or a brushless DC motor.

Due to the movement of the spindle transfer 240 along the z-axis, a center thickness of the substrate SB may be exactly aligned with a z-axis center of the groove of the grinding wheel 210.

Figure 3:
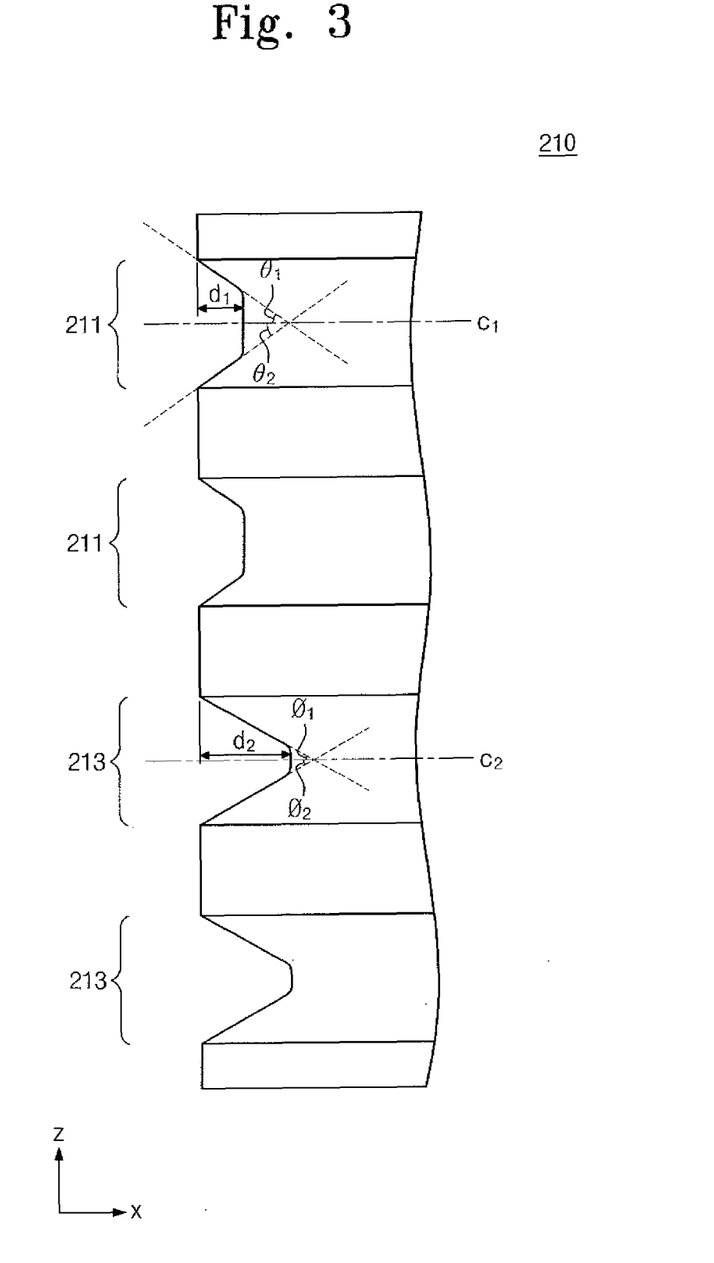
FIG. 3 is a cross-sectional view showing a grinding wheel shown in FIGS. 1 and 2.

FIG. 3 is a cross-sectional view showing a grinding wheel shown in FIGS. 1 and 2.

Referring to FIG. 3, the grinding wheel 210 includes, for example, the rough grinding groove 211 and the finish grinding groove 213. FIG. 3 shows two rough grinding grooves 211 and two finish grinding grooves 213, but the number of the rough and finish grinding grooves 211 and 213 of exemplary embodiments of the present invention are not limited thereto of thereby.

The rough grinding groove 211 has, for example, a depth d1 smaller than a depth d2 of the finish grinding groove 213.

The grinding part 200 performs the rough grinding process on the substrate SB using the rough grinding groove 211. Then, the grinding part 200 performs the finish grinding process on the substrate SB using the finish grinding groove 213. The substrate SB is more roughly ground by the rough grinding process than when the substrate SB is ground by the finish grinding process, and the ground amount of the substrate SB in the rough grinding process is significantly more than the ground amount of the substrate SB in the finish grinding process.

In a conventional substrate grinding apparatus, the rough grinding part and the finish grinding part are separated from each other. The rough grinding part and the finish grinding part are coupled with x-axis direction shafts, respectively. Therefore, whenever the grinding process is performed, the position of the rough grinding part and the finish grinding part against the substrate is required to be compensated.

However, as described above in exemplary embodiments of the present invention, the substrate grinding apparatus 1000 includes the grinding part 200 that performs the rough grinding process and the finish grinding process and moves along the x-axis direction via the x-axis shaft 251. Thus, although the position of the x-axis of the grinding part 200 is compensated once, the rough grinding process and the finish grinding process may be exactly performed. In addition, the number of the grinding parts 200 is reduced, so that the equipment for the grinding of the substrate may be significantly reduced in size and cost.

Figure 4:
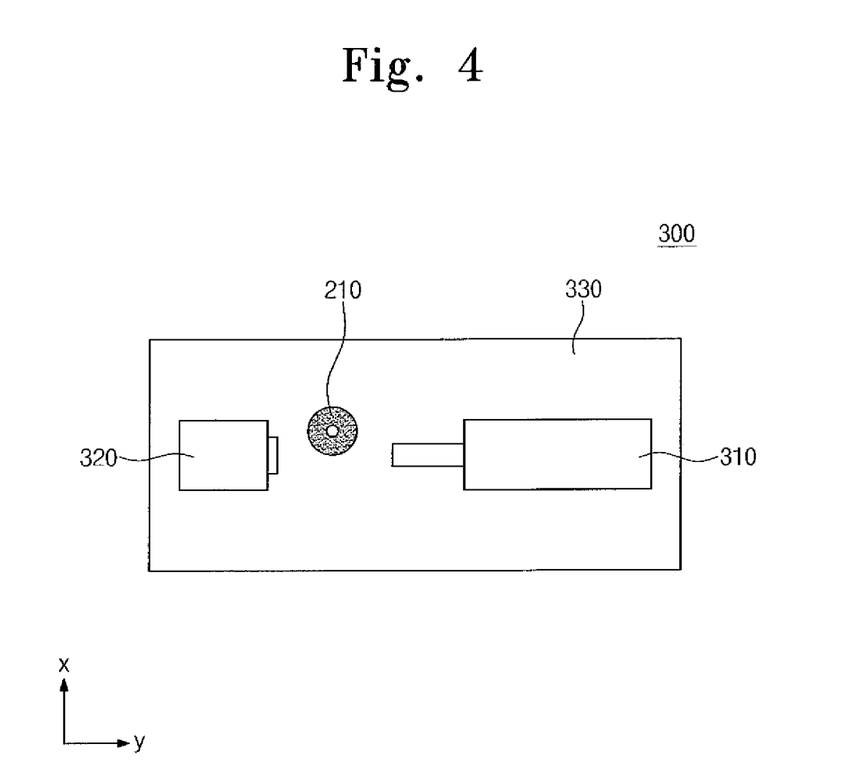
FIG. 4 is a plan view showing a camera part shown in FIGS. 1 and 2.

FIG. 4 is a plan view showing the camera part 300 shown in FIGS. 1 and 2.

Referring to FIGS. 1, 2, and 4, the camera part 300 includes, for example, a camera 310 and a backlight 320. The camera part 300 further includes, for example, a camera supporter 330 protruded from the column frame 530 to support the camera 300 and the backlight 320. The camera supporter 330 may have various shapes as long as the camera supporter 330 can securely support the camera 310 and the backlight 320.

The camera 310 is, for example, spaced apart from the backlight 320 in the y-axis direction to face the backlight 320.

The camera 300 may be disposed, for example, on a path corresponding to the x-axis along which the grinding part 200 moves. For example, the grinding part 200 moves along the x-axis guide rail 255 to allow the grinding wheel 210 to be located between the camera 310 and the backlight 320. In this case, the camera 310, the grinding wheel 210, and the backlight 320 are sequentially disposed in a straight line substantially in parallel to the y-axis.

For example, the camera 310 takes a picture of the grinding wheel 210 disposed between the camera 310 and the backlight 320 using light emitted from the backlight 320.

The camera 310 takes, for example, twelve or more sampling images per second and has a resolution to locate fine damages of grooves of the grinding wheel 210.

Although not shown in FIG. 4, the camera part 300 may further include, for example, a cleaning part to clean the grinding wheel 210. The cleaning part sprays air to the grinding wheel 210 when the grinding wheel 210 is disposed between the camera 310 and the backlight 320, thereby removing foreign substances in the rough grinding groove 211 and the finish grinding groove 213 of the grinding wheel 210.

Meanwhile, according to the present exemplary embodiment, the grinding part 200 moves in the x-axis direction before performing the rough grinding process to allow the grinding wheel 210 to be located between the camera 310 and the backlight 320. The camera 310 takes a picture of the grinding wheel 210 and analyzes the picture so as to generate information about the grinding wheel 210.

Referring to back FIGS. 1 to 4, the grinding wheel 210 information includes, for example, a position in the z-axis direction of a center line c1 crossing the rough grinding groove 211, a degree of slope θ1 and θ2 of the rough grinding groove 211, the depth d1 of the rough grinding groove 211, a position in the z-axis direction of a center line c2 crossing the finish grinding groove 213, a degree of slope Φ1 and Φ2 of the finish grinding groove 213, and the depth d2 of the finish grinding groove 213.

The substrate grinding apparatus 1000 further includes, for example, a control unit (not shown). The control unit receives the grinding wheel 210 information from the camera part 300, offset compensates for the positions in the x- and z-axes direction of the grinding part 210 on the basis of the grinding wheel 210 information, and offset compensates the position in the y-axis direction of the stage part 100.

For example, the position in the z-axis direction of the grinding part 200 may be compensated by comparing the center line c1 of the rough grinding groove 211 and the center line c2 of the finish grinding groove 213 at a position in the z-axis direction of the thickness center of the substrate SB.

Then, the grinding part 200 may perform the rough grinding process and the finish grinding process on the edge of the substrate SB.

In addition, the control unit checks to see if the grinding wheel 210 should be replaced and drives the replacing part 400 when it is determined that the grinding wheel 210 is worn out or damaged. The replacing part 400 will be described in detail later.

According to the present exemplary embodiment, the rough grinding process and the finish grinding process may be precisely performed by, for example, adjusting offset compensation values on the basis of the grinding wheel 210 information.

Figure 5A:
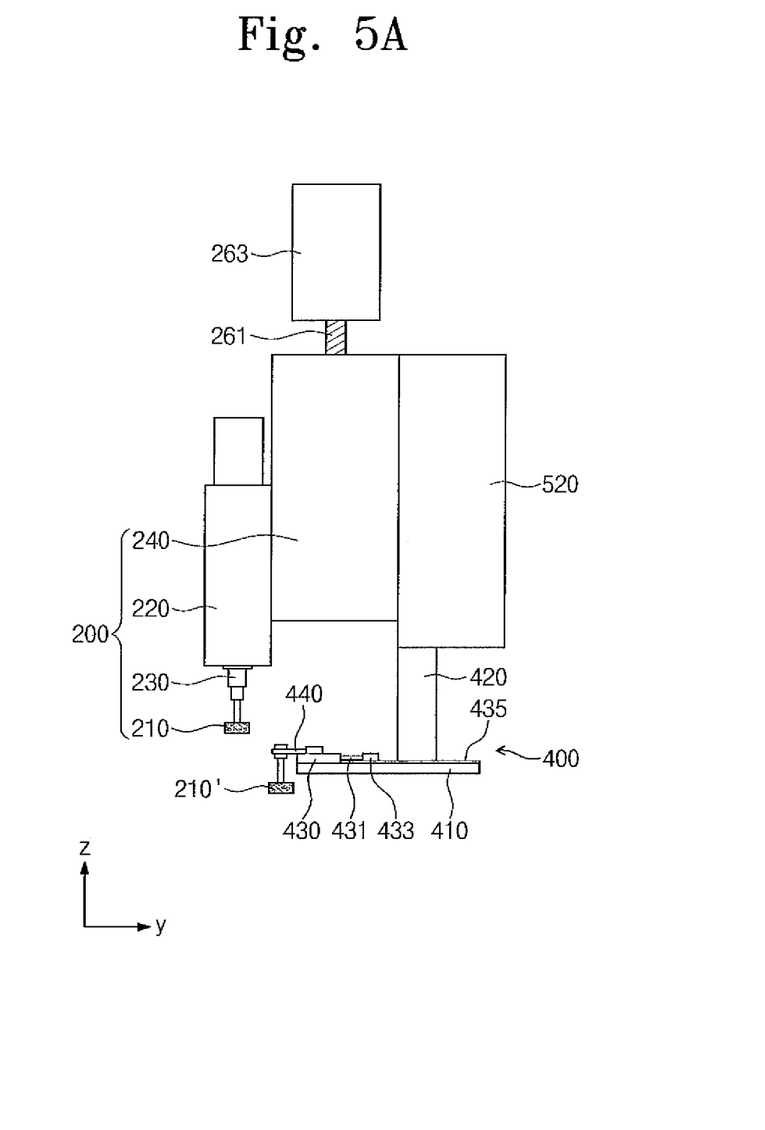
FIG. 5A is a side view showing a grinding part and a replacing part operated in a replacement mode shown in FIG. 2.
Figure 5B:
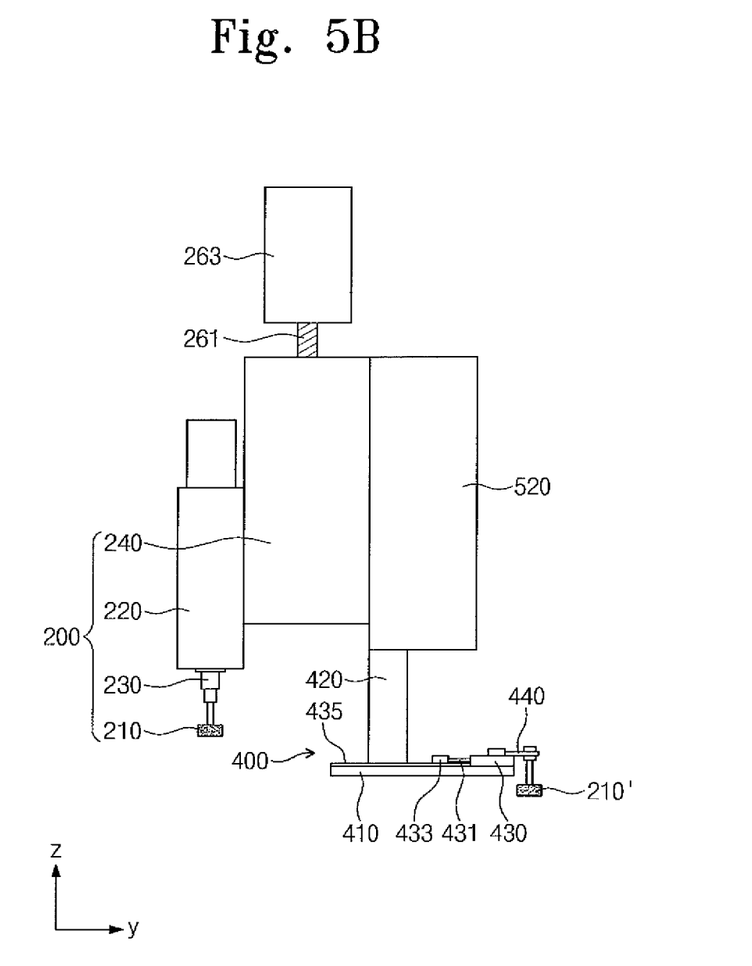
FIG. 5B is a side view showing a grinding part and a replacing part operated in a standby mode shown in FIG. 2.
Figure 6:
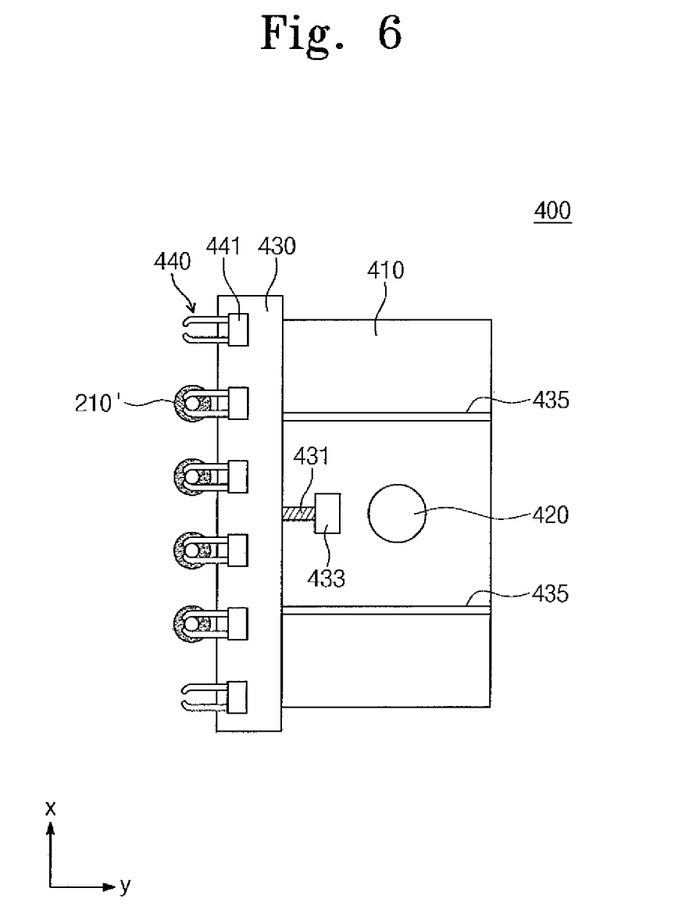
FIG. 6 is a plan view showing a replacing part shown in FIG. 2.

FIG. 5A is a side view showing the grinding part and the replacing part operated in a replacement mode shown in FIG. 2. FIG. 5B is a side view showing the grinding part and the replacing part operated in a standby mode shown in FIG. 2, and FIG. 6 is a plan view showing the replacing part shown in FIG. 2.

Referring to FIGS. 1, 2, 5A, 5B, and 6, the replacing part 400 is operated in the replacement mode or the standby mode. The replacing part 400 is coupled with the upper frame 520 and protrudes toward the lower frame 510.

The replacing part 400 includes, for example, a replacing plate 410, a rotating unit 420, a replacing table 430, and a holder 440. The replacing part 400 further includes, for example, at least one spare grinding wheel 210' to replace the grinding wheel 210 that is worn out or damaged. The spare grinding wheel 210' has, for example, the same structure and function as those of the grinding wheel 210. The spare grinding wheel 210' is not used for the grinding process until it replaces the grinding wheel 210 that is worn out or damaged.

The replacing plate 410 has, for example, a flat surface substantially in parallel with the x- and y-axes but exemplary embodiments of the present invention are not limited to the above shape for the replacing plate 410.

The rotating unit 420 fixes the upper frame 520 and the replacing plate 410 in the z-axis direction. An end portion of the rotating unit 420 is fixed to the lower portion of the upper frame 520 and the other end portion of the rotating unit 420 is rotatably coupled with the replacing plate 410 and penetrates through a surface of the replacing plate 410.

For example, the rotating unit 420 is rotated with reference to the z-axis as its rotation axis and the replacing plate 410 is rotated substantially parallel with the x- and y-axes in accordance with the rotation of the rotating unit 420.

The replacing table 430 is disposed on the replacing plate 410, which is movable. In FIG. 6, the replacing table 430 has a rectangular shape with short sides and long sides when viewed in a plan view, but exemplary embodiments of the present invention are not limited to the rectangular shape for the replacing table 430.

The replacing table 430 is coupled with a table transfer unit, and thus the replacing table 430 moves along the y-axis direction. The table transfer unit includes, for example, a shaft 431, a motor 433, and a guide rail 435.

The shaft 431 may be, for example, a mechanical actuator such as a ball screw having a ball-shaped thread which is thread-coupled with the replacing table 430 but exemplary embodiments of the present invention are not limited thereto.

For example, alternatively, shaft 431 may include, for example, other mechanical actuators such as a roller screw, a leadscrew, or a screw jack. The motor 433 rotates the shaft 431. The guide rail 435 guides the movement of the replacing table 430.

When the motor 433 is operated, the replacing table 430 moves along the y-axis direction along the guide rail 435. The motor 433 may include, for example, one of a linear motor, a stepper motor, a servo motor, a direct current (DC) motor, or an alternating current (AC) motor. For example, in an exemplary embodiment, the motor 433 may include a brushed DC servo motor, a brushless AC servo motor, or a brushless DC motor.

The replacing table 430 is located inside the process space during the replacement mode and located outside the process space during the standby mode. When the replacement mode is changed to the standby mode, the replacing plate 410 is rotated with reference to the z-axis as its rotation axis to move the replacing table 430 to the outside of the process space. When the standby mode is changed to the replacement mode, the replacing plate 410 is rotated with reference to the z-axis as its rotation axis to move the replacing table 430 to the inside of the process space.

The holder 440 is disposed on the replacing table 430 to hold the spare grinding wheel 210'. The holder 440 has, for example, a tong shape and is fixed to the replacing table 430 by a fixing unit 441.

The holder 440 is, for example, partially protruded to the outside of the replacing table 430 when viewed in a plan view so as to hold the spare grinding wheel 210'. The spare grinding wheel 210' may be held by, for example, the holder 440 so as not to overlap with the replacing plate 410 and the replacing table 430.

The holder 440 may be provided, for example, in a plural number. FIG. 6 shows six holders 440 as an example. In FIG. 6, each of four holders 440 holds the spare grinding wheel 210' and the remaining two holders 440 are empty.

Meanwhile, the control unit checks whether or not the grinding wheel 210 needs to be replaced on the basis of the grinding wheel 210 information and applies a driving signal to the replacing part 400 when it is determined that the grinding wheel 210 is worn out or damaged.

The replacing part 400 is operated in response to the driving signal from the control unit. When the standby mode is changed to the replacement mode, the replacing plate 410 is rotated, for example, about 180 degrees about the z-axis as its rotation axis to allow the replacing table 430 to be located inside of the process space. For example, the long sides of the replacing table 430 are arranged substantially in parallel with the x-axis and the spare grinding wheels 210' are arranged substantially in parallel with the x-axis. Then, the replacing table 430 moves, for example, along the y-axis to allow the grinding wheel 210 and the spare grinding wheel 210' to be located at the same surface in the x-axis direction and the z-axis direction.

The spindle transfer 240 moves in the x-axis direction to locate the grinding wheel 210 at a position corresponding to the holder 440 that is empty. Then, the spindle transfer 240 descends in the x-axis direction and the grinding chuck 230 releases the claw, and thus the worn out or damaged grinding wheel 210 is discharged to the holder 440 that is empty. Next, the spindle transfer 240 ascends in the z-axis direction.

Then, the spindle transfer 240 moves in the x-axis direction to locate the grinding chuck 230 at a position corresponding to the spare grinding wheel 210' when viewed in a plan view. The spindle transfer 240 descends in the z-axis direction and fastens the grinding chuck 230 so as to allow the spare grinding wheel 210' to be equipped with the grinding chuck 230. Then, the spindle transfer 240 ascends in the z-axis direction.

After replacing the grinding wheel 210, the grinding part 200 moves to the camera part 300 again. The camera part 300 takes a picture of the spare grinding wheel 210' and analyzes the picture of the spare grinding wheel 210' to generate the grinding wheel 210 information.

The replacing part 400 is operated in the standby mode after the grinding wheel 210 is replaced. When the replacement mode is changed to the standby mode, the replacing plate 410 is rotated, for example, about 180 degrees about the z-axis as its rotation axis to move the replacing table 430 to the standby position outside the process space. In a case that the replacing table 430 is in the standby position, an operator may provide a new spare grinding wheel 210' to the holder 440 that is empty or pick up the worn out or damaged grinding wheel 210 from the holder 440.

In case of the conventional substrate grinding apparatus, when the grinding wheel is worn out or damaged, the operation of the substrate grinding apparatus is stopped to manually replace the worn out or damaged grinding wheel 210.

However, in the substrate grinding apparatus 1000 according to the present exemplary embodiment, the replacing part 400 is operated in the replacement mode to replace the worn out or damaged grinding wheel 210 with a spare grinding wheel 210' when the grinding wheel 210 is worn out or damaged, and thus a replacing time for the grinding wheel 210 may be shortened. In addition, as the replacing part 400 moves the replacing table 430 to the outside of the process space so as to provide the spare grinding wheel 210' or pick up the worn out or damaged grinding wheel 210 after the replacement of the worn out or damaged grinding wheel 210 is completed, the grinding process may be continuously performed in the process space. Therefore, the process efficiency of the substrate grinding apparatus 1000 may be increased.

Hereinafter, a substrate grinding apparatus 2000 according to an exemplary embodiment will be described.

Figure 7:
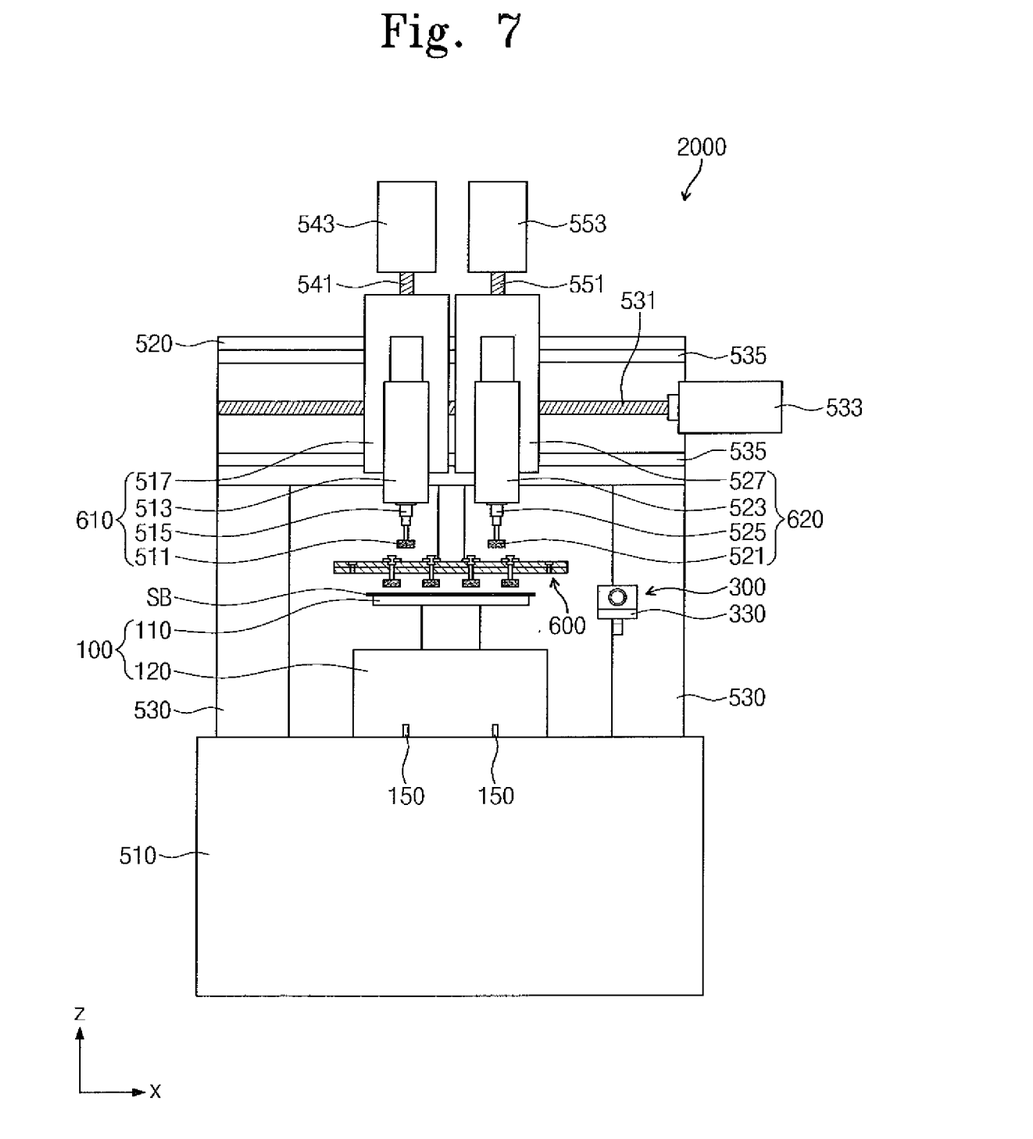
FIG. 7 is a front view showing a substrate grinding apparatus according to an exemplary embodiment of the present invention.

FIG. 7 is a front view showing the substrate grinding apparatus 2000 according to an exemplary embodiment of the present invention.

The substrate grinding apparatus 2000 shown in FIG. 7 has the same configuration and function as those of the substrate grinding apparatus 1000 shown in FIG. 1 except for a grinding part and a replacing part. Thus, detailed descriptions of the same structural and functional elements in FIG. 7 as the grinding apparatus 1000 shown in FIG. 1 will be omitted.

The grinding part includes, for example, a first grinding part 610 and a second grinding part 620.

For example, the first grinding part 610 performs a rough grinding process and the second grinding part 620 performs a finish grinding process.

The first grinding part 610 includes, for example, a rough grinding wheel 511, a first spindle 513, a first grinding chuck 515, and a first spindle transfer 517.

The second grinding part 620 includes, for example, a finish grinding wheel 521, a second spindle 523, a second grinding chuck 525, and a second spindle transfer 527.

The first spindle 513 is equipped with, for example, the rough grinding wheel 511 to pivot the rough grinding wheel 511 about the z-axis.

The second spindle 523 is equipped with, for example, the finish grinding wheel 521 to pivot the finish grinding wheel 521 about the z-axis.

The first grinding chuck 515 connects the first spindle 513 and the rough grinding wheel 511.

The second grinding chuck 525 connects the second spindle 523 and the finish grinding wheel 521. The rough grinding wheel 511 includes, for example, a rough grinding groove and the finish grinding wheel 521 includes a finish grinding groove. The rough grinding groove and the finish grinding groove have, for example, the same structure and function as those of the rough grinding groove 211 and the finish grinding groove 213 shown in FIG. 3, and thus detailed descriptions of the rough grinding groove and the finish grinding groove in the present exemplary embodiment will be omitted.

The first spindle transfer 517 is connected to an x-axis transfer unit and a first z-axis transfer unit, so that the first spindle transfer 517 moves in the x-axis direction and the z-axis direction. The x-axis transfer unit includes, for example, an x-axis shaft 531, an x-axis motor 533, and an x-axis guide rail 535. The first z-axis transfer unit includes, for example, a first z-axis shaft 541, a first z-axis motor 543, and a first z-axis guide rail (not shown).

The second spindle transfer 527 is connected to the x-axis transfer unit and a second z-axis transfer unit, and thus the second spindle transfer 527 moves in the x-axis direction and the z-axis direction. The second z-axis transfer unit includes, for example, a second z-axis shaft 551, a second z-axis motor 553, and a second z-axis guide rail (not shown). The first x-axis motor 533, the first z-axis motor 543 and the second z-axis motor 553 may each include, for example, one of a linear motor, a stepper motor, a servo motor, a direct current (DC) motor, or an alternating current (AC) motor. For example, in an exemplary embodiment, the first x-axis motor 533, the first z-axis motor 543 and the second z-axis motor 553 may each include a brushed DC servo motor, a brushless AC servo motor, or a brushless DC motor.

In an exemplary embodiment, the x-axis transfer unit, the first z-axis transfer unit and the second z-axis transfer unit may be, for example, a conveyor such as a belt conveyor, a live roller belt conveyor, or a chain conveyor.

As the first spindle transfer 517 and the second spindle transfer 527 are connected to the x-axis transfer unit, the first spindle transfer 517 and the second spindle transfer 527 may move together with each other along the x-axis direction. Accordingly, the first spindle transfer 517 and the second spindle transfer 527 may not be dislocated from each other when the first spindle transfer 517 and the second spindle transfer 527 move in the x-axis direction as the first spindle transfer 517 and the second spindle transfer 527 are commonly connected to the x-axis guide rail 535.

On the other hand, the first spindle transfer 517 and the second spindle transfer 527 are connected to the first z-axis transfer unit and the second z-axis transfer unit, respectively, and thus the first spindle transfer 517 and the second spindle transfer 527 may independently move in the z-axis direction.

According to the present exemplary embodiment, the second spindle transfer 527 ascends along the z-axis direction and maintains a standby state while the first grinding part 610 performs the rough grinding process on the substrate SB. The substrate SB may be formed of, for example, a transparent insulation material such as glass, quartz, or plastic. Further, in an exemplary embodiment, the transparent glass may include, for example, tempered glass. Further, in an exemplary embodiment, the transparent plastic may be, for example, one of polycarbonate (PC), polyester (PET), polypropylene (PP), polyethylene (PE) and polymethyl methacrylate (PMMA). Alternatively, the substrate SB may instead be formed of a non-transparent material such as, for example, a silicon plate or ceramics.

After the rough grinding process is finished, the second spindle transfer 527 descends along the z-axis direction and the second grinding part 620 performs the finish grinding process on the substrate SB. In this case, the first spindle transfer 517 ascends along the z-axis direction and maintains the standby state.

The replacing part 600 has, for example, the substantially same configuration as that of the replacing part 400 shown in FIG. 1. The replacing part 600 includes, for example, at least one spare grinding wheel. The spare grinding wheel may be, for example, the rough grinding wheel or the finish grinding wheel.

An abrasion loss of the substrate SB in the rough grinding process may be greater than that of the substrate SB in the finish grinding process, so the rate of abrasion of the rough grinding groove of the rough grinding wheel 511 may be greater than that of the finish grinding groove of the finish grinding wheel 521. Thus, the life-span of the rough grinding wheel 511 may be shorter than the life-span of the finish grinding wheel 521.

According to the present exemplary embodiment, the rough grinding wheel 511 and the finish grinding wheel 521 may be separately replaced by the replacing part 600, so that the number of the grinding wheels required to grind the substrate SB may be reduced, thereby reducing the cost of grinding the substrate SB.

Having described exemplary embodiments of the present invention, it is further noted that it is readily apparent to those of ordinary skill in the art that various modifications may be made without departing from the spirit and scope of the invention which is defined by the metes and bounds of the appended claims.

What is claimed is:

1. An apparatus for grinding a substrate, comprising:
a stage part configured to support a substrate thereon;
a grinding part that includes a grinding wheel configured to grind an edge of the substrate;
a camera part configured to take a picture of the grinding wheel, analyze the picture of the grinding wheel and generate information about the grinding wheel;
a replacing part that includes a spare grinding wheel and a replacing table, wherein the replacing part is configured to provide the spare grinding wheel to the grinding part or pick up the grinding wheel from the grinding part and the replacing table is configured such that the replacing table is disposed inside a process space, in which the substrate is ground, during a replacement mode and disposed outside the process space during a standby mode such that the spare grinding wheel can be provided prior to being picked up and the grinding wheel may be removed after being picked up from the grinding part without stopping the operation of the substrate grinding apparatus; and
a control unit configured to receive the grinding wheel information from the camera part and offset compensate a position of the grinding wheel on the basis of the grinding wheel information or communicate with the replacing part to replace the grinding wheel on the basis of the grinding wheel information.

2. The apparatus of claim 1, wherein the stage part is configured to move along a y-axis direction and the grinding part is configured to move along an x-axis direction and a z-axis direction.

3. The apparatus of claim 1, wherein the grinding part is connected to one x-axis transfer unit.

4. The apparatus of claim 3, wherein each of the grinding wheel and the spare grinding wheel comprises a rough grinding groove and a finish grinding groove.

5. The apparatus of claim 1, wherein the camera part comprises:

a camera that is configured to take the picture of the grinding wheel; and a backlight disposed facing the camera and configured to provide a light to the camera.

6. The apparatus of claim 5, wherein the camera, the grinding wheel, and the backlight are sequentially disposed in a straight line substantially parallel to the y-axis.

7. The apparatus of claim 1, wherein the replacing part is configured to be operated in the replacement mode or the standby mode on the basis of the grinding wheel information.

8. The apparatus of claim 7, wherein the replacing part further comprises:

a replacing plate configured to be rotated with reference to a z-axis as its rotation axis; and a holder disposed on the replacing table and configured to hold the spare grinding wheel, wherein the replacing table is disposed on the replacing plate and configured to move along a y-axis direction.

9. The apparatus of claim 8, wherein the replacing plate is configured to be rotated about 180 degrees about the z-axis as its rotation axis when the replacement mode is changed to the standby mode.

10. The apparatus of claim 1, wherein the grinding part comprises:

a first grinding part that includes a rough grinding wheel; and a second grinding part that includes a finish grinding wheel.

11. The apparatus of claim 10, wherein the first grinding part and the second grinding part are connected to a same x-axis transfer unit.

12. The apparatus of claim 11, wherein the first grinding part and the second grinding part are connected to separate z-axis transfer units.

13. A method of grinding a substrate, comprising:

loading a substrate into a process space;

grinding an edge of the substrate within the process space using a grinding wheel held by a grinding part;

taking a picture of the grinding wheel and analyzing the picture of the grinding wheel to generate information about the grinding wheel;

checking whether the grinding wheel is required to be replaced or not on the basis of the grinding wheel information; and performing replacement mode steps when it is determined that the grinding wheel is required to be replaced, wherein the replacement mode steps include:

moving a replacement table carrying a replacement grinding wheel from outside the process space into the process space;

discharging the grinding wheel and installing the replacement grinding wheel such that the replacement grinding wheel is on the grinding part and the grinding wheel is on the replacement table; and moving the replacement table carrying the grinding wheel from inside the process space to outside the process space, and wherein the performance of the replacement mode steps occurs without stopping the operation of the substrate grinding apparatus.

14. An apparatus for grinding a substrate, comprising:

a stage part which includes a stage configured to support a substrate thereon and a stage body fixed to the stage;

a lower frame supporting the stage part, wherein the stage body is disposed between the stage and the lower frame;

a grinding part that includes a grinding wheel configured to grind an edge of the substrate, a spindle operatively connected to the grinding wheel and configured to pivot the grinding wheel along a z-axis direction, a grinding chuck connecting the spindle and the grinding wheel to each other, and a spindle transfer;

an x-axis transfer unit configured move in an x-axis direction which is perpendicular to the z-axis direction, wherein the x-axis transfer unit includes an x-axis shaft operatively connected to the spindle transfer, an x-axis motor which is configured to rotate the x-axis shaft, and an x-axis guide rail which is configured to guide movement of the spindle transfer along the x-axis direction;

a camera part including a camera configured to take a picture of the grinding wheel, analyze the picture of the grinding wheel and generate information about the grinding wheel, a backlight facing the camera and configured to provide light to the camera, and a camera supporter, wherein the camera and the backlight are spaced apart from each other and are disposed on the camera supporter;

a replacing part that includes a spare grinding wheel and a replacing table, wherein the replacing part is configured to provide the spare grinding wheel to the grinding part or pick up the grinding wheel from the grinding part and the replacing table is configured such that the replacing table is disposed inside a process space, in which the substrate is ground, during a replacement mode and disposed outside the process space during a standby mode such that the spare grinding wheel can be provided prior to being picked up and the grinding wheel may be removed after being picked up from the grinding part without stopping the operation of the substrate grinding apparatus;

a control unit configured to receive the grinding wheel information from the camera part and offset compensate a position of the grinding wheel on the basis of the grinding wheel information or communicate with the replacing part to replace the grinding wheel on the basis of the grinding wheel information;

an upper frame supporting the grinding part and the replacing part; and a column frame disposed between the upper frame and the lower frame at a position corresponding to an end portion of the lower frame and the upper frame.

15. The apparatus of claim 14, further comprising a z-axis transfer unit configured to move in the z-axis direction, wherein the z-axis transfer unit includes a z-axis shaft operatively connected to the spindle transfer, a z-axis motor which is configured to rotate the z-axis shaft, and a z-axis guide rail which is configured to guide movement of the spindle transfer along the z-axis direction.

16. The apparatus of claim 15, further comprising a y-axis transfer unit configured to move in a y-axis direction which is perpendicular to the z-axis direction, wherein the y-axis transfer unit includes a y-axis shaft operatively connected to the stage body, a y-axis motor which is configured to rotate the y-axis shaft, and a y-axis guide rail which is configured to guide movement of the stage body along the y-axis direction.

17. The apparatus of claim 15, wherein at least one of the x-axis shaft or the z-axis shaft includes a ball screw having a ball shaped thread which is coupled to the spindle transfer.

18. The apparatus of claim 14, wherein each of the grinding wheel and the spare grinding wheel comprise a rough grinding groove and a finish grinding groove, wherein the rough grinding groove has a depth smaller than a depth of the finish grinding groove.

19. The apparatus of claim 14, wherein an upper portion of the grinding chuck is coupled with a lower portion of the spindle and a lower portion of the grinding chuck is removably coupled with the grinding wheel.

20. The apparatus of claim 14, wherein the camera supporter protrudes from the column frame to support the camera and the backlight.

21. The apparatus of claim 16, wherein the replacing part comprises:
- a replacing plate having a substantially flat surface parallel with the x-axis direction and the y-axis direction;
- a rotating unit configured to fix the upper frame and the replacing part in the z-axis direction and wherein the rotating unit is configured to rotate with reference to the z-axis direction as its rotating axis and to rotate the replacing plate in a direction substantially parallel to the x-axis direction and the y-axis direction; and
- a holder disposed on the replacing table and configured to hold the spare grinding wheel,
- wherein the replacing table is disposed on the replacing plate and configured to move along a y-axis direction.

22. The apparatus of claim 18, wherein the grinding wheel information comprises a position in the z-axis direction of a center line crossing the rough grinding groove, a degree of slope of the rough grinding groove, the depth of the rough grinding groove, a position in the z-axis direction of a center line crossing the finish grinding groove, a degree of slope of the finish grinding groove, and the depth of the finish grinding groove.

* * * * *